US008616552B2

(12) United States Patent
Czyzewski et al.

(10) Patent No.: US 8,616,552 B2
(45) Date of Patent: *Dec. 31, 2013

(54) METHODS AND APPARATUSES FOR AN AUTOMATIC CARD HANDLING DEVICE AND COMMUNICATION NETWORKS INCLUDING SAME

(75) Inventors: Zbigniew Czyzewski, Henderson, NV (US); Vladislav Zvercov, Las Vegas, NV (US); Attila Grauzer, Las Vegas, NV (US)

(73) Assignee: SHFL entertainment, Inc., Las Vegas, NV (US)

( * ) Notice: Subject to any disclaimer, the term of this patent is extended or adjusted under 35 U.S.C. 154(b) by 907 days.

This patent is subject to a terminal disclaimer.

(21) Appl. No.: 11/558,818

(22) Filed: Nov. 10, 2006

(65) Prior Publication Data

US 2008/0113700 A1 May 15, 2008
US 2013/0084929 A9 Apr. 4, 2013

Related U.S. Application Data

(63) Continuation-in-part of application No. 09/967,500, filed on Sep. 28, 2001, now Pat. No. 8,337,296.

(51) Int. Cl.
*A63F 1/12* (2006.01)
*A63F 1/14* (2006.01)
*G06F 17/00* (2006.01)
*G06F 19/00* (2011.01)

(52) U.S. Cl.
USPC ............... 273/149 R; 463/11; 463/16; 463/42

(58) Field of Classification Search
USPC ....... 273/149 R; 1/149 R; 463/11–13, 16, 25, 463/29–31, 40–42
See application file for complete search history.

(56) References Cited

U.S. PATENT DOCUMENTS 3,810,627 A 5/1974 Levy
3,909,002 A 9/1975 Levy
4,339,798 A 7/1982 Hedges et al.
(Continued)

FOREIGN PATENT DOCUMENTS

WO 97/10577 3/1997
WO 2004/112923 A1 12/2004

OTHER PUBLICATIONS

Shuffle Master Gaming, Service Manual, ACE™ Single Deck Card Shuffler, 63 pages, © 1998 Shuffle Master, Inc.
Shuffle Master Gaming, Service Manual, Let It Ride Bonus® With Universal Keypad, 112 pages, © 2000 Shuffle Master, Inc.
International Search Report for International Application No. PCT/US07/23168, mailed Sep. 12, 2008.
PCT International Search Report for PCT/US2007/022894, dated Jun. 11, 2008, 2 pages.
International Search Report for International Application No. PCT/US2007/022858, mailed Apr. 18, 2008, 2 pages.

(Continued)

*Primary Examiner* — Milap Shah
(74) *Attorney, Agent, or Firm* — TraskBritt

(57) ABSTRACT

An automatic card handling device, automatic card handling devices within a network, and methods of use are disclosed. An automatic card handling device includes a shuffling apparatus with a controller and configured to deliver a set of shuffled cards, and a communication module operably coupled to the controller. The communication module is configured for establishing an electronic communication with a local or world-wide network and thereafter sending and receiving information related to the operation of the automatic card handling device across the network. A network of automatic card handling devices may include a plurality of automatic card shufflers. The network may also include at least one server operably coupled to the plurality of automatic card shufflers. In addition, the server may be operably coupled to a service center through a world-wide network.

37 Claims, 6 Drawing Sheets

(56) References Cited

U.S. PATENT DOCUMENTS

| | | | |
|---|---|---|---|
| 4,467,424 A | 8/1984 | Hedges et al. | |
| 4,531,187 A | 7/1985 | Uhland | |
| 4,750,743 A | 6/1988 | Nicoletti | |
| 4,755,941 A | 7/1988 | Bacchi | |
| 4,807,884 A * | 2/1989 | Breeding | 273/149 R |
| 4,861,041 A | 8/1989 | Jones et al. | |
| 5,224,712 A | 7/1993 | Laughlin et al. | |
| 5,288,081 A | 2/1994 | Breeding et al. | |
| 5,356,145 A | 10/1994 | Verschoor | |
| 5,362,053 A | 11/1994 | Miller | |
| 5,374,061 A | 12/1994 | Albrecht | |
| 5,397,133 A * | 3/1995 | Penzias | 463/22 |
| 5,586,936 A | 12/1996 | Bennett et al. | |
| 5,605,334 A | 2/1997 | McCrea, Jr. | |
| 5,613,912 A | 3/1997 | Slater et al. | |
| 5,651,548 A | 7/1997 | French et al. | |
| 5,669,816 A | 9/1997 | Garczynski et al. | |
| 5,681,039 A | 10/1997 | Miller | |
| 5,707,287 A | 1/1998 | McCrea, Jr. | |
| 5,722,893 A | 3/1998 | Hill et al. | |
| 5,735,525 A | 4/1998 | McCrea, Jr. | |
| 5,735,742 A | 4/1998 | French | |
| 5,743,798 A | 4/1998 | Adams et al. | |
| 5,770,533 A | 6/1998 | Franchi | |
| 5,772,505 A | 6/1998 | Garczynski et al. | |
| 5,779,546 A * | 7/1998 | Meissner et al. | 463/25 |
| 5,781,647 A | 7/1998 | Fishbine et al. | |
| 5,911,626 A | 6/1999 | McCrea, Jr. | |
| 5,919,090 A | 7/1999 | Mothwurf | |
| 5,941,769 A | 8/1999 | Order | |
| 5,985,305 A | 11/1999 | Peery et al. | |
| 5,989,122 A * | 11/1999 | Roblejo | 463/22 |
| 6,039,650 A | 3/2000 | Hill | |
| 6,069,564 A | 5/2000 | Hatano et al. | |
| 6,071,190 A | 6/2000 | Weiss et al. | |
| 6,093,103 A | 7/2000 | McCrea, Jr. | |
| 6,117,012 A | 9/2000 | McCrea, Jr. | |
| 6,126,166 A | 10/2000 | Lorson et al. | |
| 6,149,154 A | 11/2000 | Grauzer et al. | |
| 6,154,131 A | 11/2000 | Jones, II et al. | |
| 6,165,069 A | 12/2000 | Sines et al. | |
| 6,183,362 B1 | 2/2001 | Boushy | |
| 6,186,895 B1 | 2/2001 | Oliver | |
| 6,200,218 B1 | 3/2001 | Lindsay | |
| 6,234,900 B1 | 5/2001 | Cumbers | |
| 6,236,223 B1 | 5/2001 | Brady et al. | |
| 6,250,632 B1 * | 6/2001 | Albrecht | 273/149 R |
| 6,254,002 B1 | 7/2001 | Litman | |
| 6,254,484 B1 | 7/2001 | McCrea, Jr. | |
| 6,257,981 B1 | 7/2001 | Acres et al. | |
| 6,267,248 B1 | 7/2001 | Johnson et al. | |
| 6,267,671 B1 | 7/2001 | Hogan | |
| 6,270,404 B2 | 8/2001 | Sines et al. | |
| 6,293,546 B1 * | 9/2001 | Hessing et al. | 273/138.2 |
| 6,299,534 B1 * | 10/2001 | Breeding et al. | 463/25 |
| 6,299,536 B1 | 10/2001 | Hill | |
| 6,342,830 B1 | 1/2002 | Want et al. | |
| 6,346,044 B1 | 2/2002 | McCrea, Jr. | |
| 6,403,908 B2 | 6/2002 | Stardust et al. | |
| 6,446,864 B1 | 9/2002 | Kim et al. | |
| 6,460,848 B1 | 10/2002 | Soltys et al. | |
| 6,517,435 B2 | 2/2003 | Soltys et al. | |
| 6,517,436 B2 | 2/2003 | Soltys et al. | |
| 6,520,857 B2 | 2/2003 | Soltys et al. | |
| 6,527,271 B2 | 3/2003 | Soltys et al. | |
| 6,530,836 B2 | 3/2003 | Soltys et al. | |
| 6,530,837 B2 | 3/2003 | Soltys et al. | |
| 6,533,276 B2 | 3/2003 | Soltys et al. | |
| 6,533,662 B2 | 3/2003 | Soltys et al. | |
| 6,579,180 B2 | 6/2003 | Soltys et al. | |
| 6,579,181 B2 | 6/2003 | Soltys et al. | |
| 6,582,301 B2 | 6/2003 | Hill | |
| 6,588,751 B1 * | 7/2003 | Grauzer et al. | 273/149 R |
| 6,595,857 B2 | 7/2003 | Soltys et al. | |
| 6,629,894 B1 | 10/2003 | Purton | |
| 6,638,161 B2 | 10/2003 | Soltys et al. | |
| 6,652,379 B2 | 11/2003 | Soltys et al. | |
| 6,655,684 B2 | 12/2003 | Grauzer et al. | |
| 6,663,490 B2 | 12/2003 | Soltys et al. | |
| 6,676,127 B2 | 1/2004 | Johnson et al. | |
| 6,676,517 B2 | 1/2004 | Beavers | |
| 6,685,568 B2 | 2/2004 | Soltys et al. | |
| 6,688,979 B2 | 2/2004 | Soltys et al. | |
| 6,712,696 B2 | 3/2004 | Soltys et al. | |
| 6,726,205 B1 * | 4/2004 | Purton | 273/148 R |
| 6,758,751 B2 | 7/2004 | Soltys et al. | |
| 6,774,782 B2 | 8/2004 | Runyon et al. | |
| 6,834,251 B1 | 12/2004 | Fletcher | |
| 6,848,616 B2 | 2/2005 | Tsirline et al. | |
| 6,848,994 B1 | 2/2005 | Knust et al. | |
| 6,857,961 B2 | 2/2005 | Soltys et al. | |
| 6,893,347 B1 * | 5/2005 | Zilliacus et al. | 463/41 |
| 6,964,612 B2 | 11/2005 | Soltys et al. | |
| 7,011,309 B2 | 3/2006 | Soltys et al. | |
| 7,029,009 B2 | 4/2006 | Grauzer et al. | |
| 7,036,818 B2 | 5/2006 | Grauzer et al. | |
| 7,059,602 B2 | 6/2006 | Grauzer et al. | |
| 7,073,791 B2 | 7/2006 | Grauzer et al. | |
| 7,084,769 B2 | 8/2006 | Bauer et al. | |
| 7,106,201 B2 | 9/2006 | Tuttle | |
| 7,113,094 B2 | 9/2006 | Garber et al. | |
| 7,114,718 B2 | 10/2006 | Grauzer et al. | |
| 7,300,056 B2 * | 11/2007 | Gioia et al. | 273/149 R |
| 7,316,615 B2 | 1/2008 | Soltys et al. | |
| 7,390,256 B2 | 6/2008 | Soltys et al. | |
| 7,686,681 B2 | 3/2010 | Soltys et al. | |
| 8,016,663 B2 | 9/2011 | Soltys et al. | |
| 8,337,296 B2 * | 12/2012 | Grauzer et al. | 463/29 |
| 2002/0068635 A1 * | 6/2002 | Hill | 463/47 |
| 2002/0094869 A1 * | 7/2002 | Harkham | 463/42 |
| 2002/0113368 A1 * | 8/2002 | Hessing et al. | 273/149 R |
| 2002/0142820 A1 | 10/2002 | Bartlett | |
| 2002/0187830 A1 | 12/2002 | Stockdale et al. | |
| 2003/0003997 A1 | 1/2003 | Vuong et al. | |
| 2003/0064798 A1 | 4/2003 | Grauzer et al. | |
| 2003/0067112 A1 * | 4/2003 | Grauzer et al. | 273/149 R |
| 2003/0151194 A1 * | 8/2003 | Hessing et al. | 273/149 R |
| 2003/0195025 A1 | 10/2003 | Hill | |
| 2004/0067789 A1 | 4/2004 | Grauzer et al. | |
| 2004/0100026 A1 | 5/2004 | Haggard | |
| 2004/0224777 A1 * | 11/2004 | Smith et al. | 463/47 |
| 2005/0026680 A1 | 2/2005 | Gururajan | |
| 2005/0051955 A1 | 3/2005 | Schubert et al. | |
| 2005/0051965 A1 | 3/2005 | Gururajan | |
| 2005/0082750 A1 | 4/2005 | Grauzer et al. | |
| 2005/0104290 A1 * | 5/2005 | Grauzer et al. | 273/149 R |
| 2005/0110210 A1 * | 5/2005 | Soltys et al. | 273/149 P |
| 2005/0113171 A1 * | 5/2005 | Hodgson | 463/42 |
| 2005/0137005 A1 | 6/2005 | Soltys et al. | |
| 2005/0242500 A1 | 11/2005 | Downs, III | |
| 2005/0272501 A1 | 12/2005 | Tran et al. | |
| 2005/0288083 A1 | 12/2005 | Downs, III | |
| 2005/0288086 A1 | 12/2005 | Schubert et al. | |
| 2006/0063577 A1 | 3/2006 | Downs, III et al. | |
| 2006/0183540 A1 | 8/2006 | Grauzer et al. | |
| 2006/0199649 A1 | 9/2006 | Soltys et al. | |
| 2006/0205508 A1 * | 9/2006 | Green | 463/40 |
| 2006/0252521 A1 | 11/2006 | Gururajan et al. | |
| 2006/0252554 A1 | 11/2006 | Gururajan et al. | |
| 2007/0259709 A1 | 11/2007 | Kelly et al. | |
| 2008/0113783 A1 | 5/2008 | Czyzewski | |

OTHER PUBLICATIONS

Written Opinion of the International Searching Authority for International Application No. PCT/US2007/022858, mailed Apr. 18, 2008, 5 pages.

Notification of Transmittal of International Preliminary Examination Report for corresponding International Application No. PCT/US02/31105 filed Sep. 27, 2002.

* cited by examiner

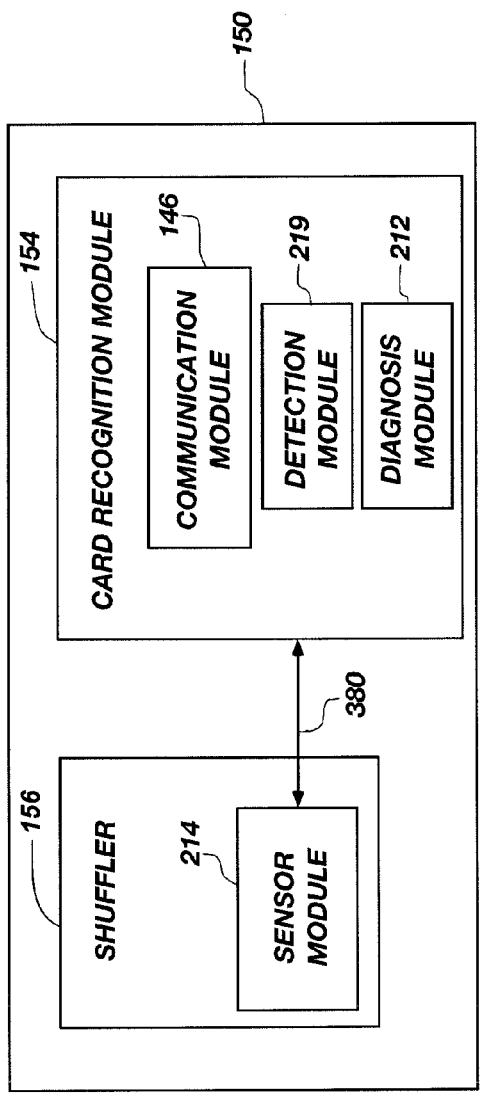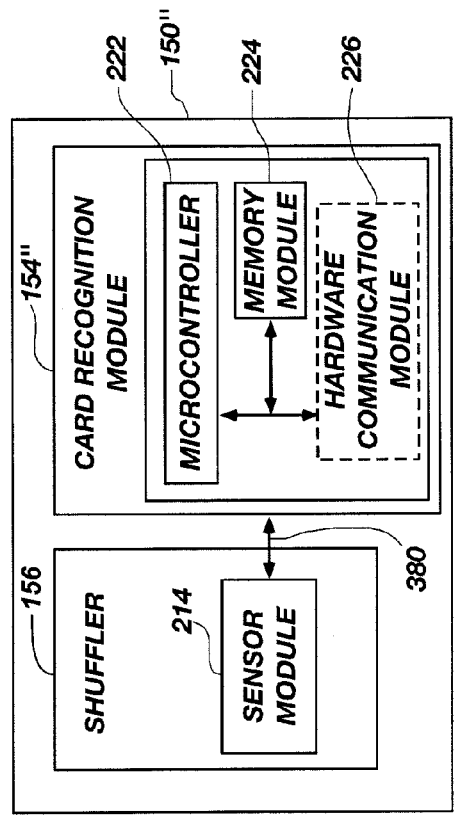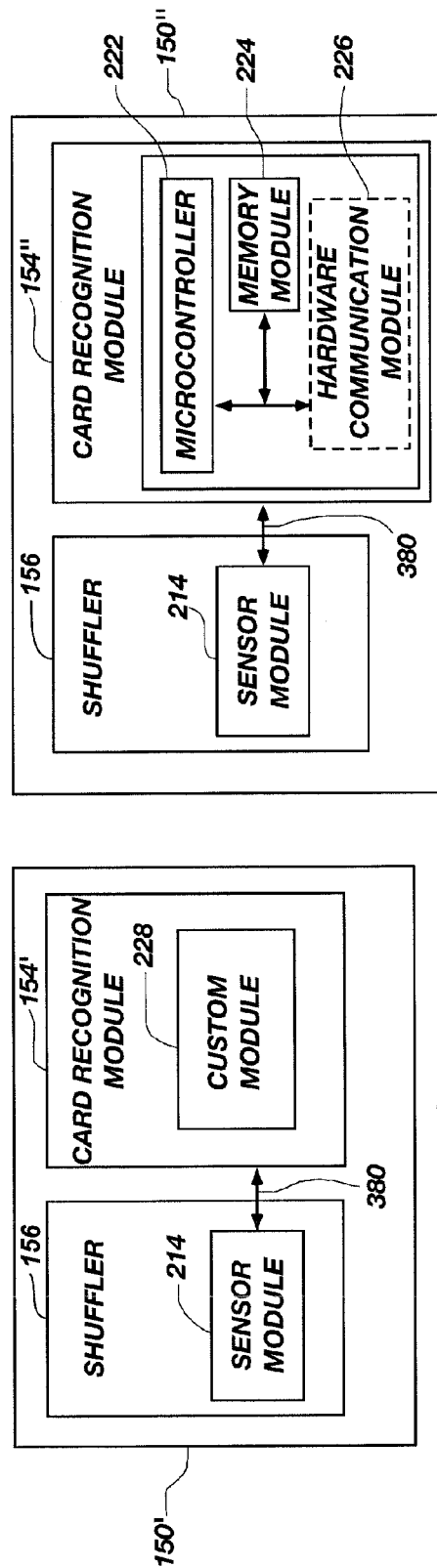
FIG. 3(a)
FIG. 3(b)
FIG. 3(c)

METHODS AND APPARATUSES FOR AN AUTOMATIC CARD HANDLING DEVICE AND COMMUNICATION NETWORKS INCLUDING SAME

CROSS-REFERENCE TO RELATED APPLICATIONS

The present application is related to the following applications: U.S. patent application Ser. No. 11/558,810, filed Nov. 10, 2006, entitled "CASINO TABLE GAME MONITORING SYSTEM," now abandoned; U.S. patent application Ser. No. 11/558,817, filed Nov. 10, 2006, entitled "METHOD AND APPARATUS PROVIDING GAMING TABLE WITH RFID ANTENNAS AND SHIELDING," now abandoned; and U.S. patent application Ser. No. 11/558,823, filed Nov. 10, 2006, entitled "CASINO CARD SHOES, SYSTEMS, AND METHODS FOR A NO PEEK FEATURE," now abandoned; the contents of each of which are incorporated by reference in their entirety herein. This application is a continuation-in-part of U.S. patent application Ser. No. 09/967,500, filed Sep. 28, 2001, now U.S. Pat. No. 8,337,296, issued Dec. 25, 2012.

FIELD OF THE INVENTION

This invention, in various embodiments, relates generally to playing card handling devices and, more specifically, to apparatuses comprising an automatic card handling device suitable for use in a communications network, automatic card handling devices operably coupled to a communication network, and methods of operation thereof.

BACKGROUND OF THE INVENTION

State of the Art

Card handling devices used in the gaming industry are well known in the art and are conventionally used for increasing the efficiency, security and game speed in live table games such as blackjack, baccarat, and various forms of poker. Card handling devices, such as card shufflers, may perform a variety of functions including randomly shuffling one or more decks of playing cards in an efficient and thorough manner. In a live table game, it is important that the playing cards are shuffled in an efficient and thorough manner to prevent players from having an advantage by knowing the position of specific cards or groups of cards in the final arrangement of cards delivered in the play of the game. Additionally, it is advantageous to have the playing cards shuffled in a very short period of time in order to minimize any delay in the play of the game.

Conventional card shufflers may also include a card recognition device which, in addition to aiding in the shuffling of cards, may verify the contents of the deck and ensure that the deck contains not only all the appropriate cards, but also that the deck does not contain any cards which do not belong therein. The card recognition device enables a card shuffler to verify the contents of the deck(s) by using a local computer or a processor contained within the shuffler. The card recognition device of a conventional card shuffler may comprise a camera that takes a picture of each card entered into the shuffler and then extracts the card rank (2-10, Jack-Ace) and suit (spade, club, heart, diamond) from the picture. Alternatively, other conventional card shufflers may comprise a card recognition device that employs sensors and a hardware component that may sense the rank and suit from the face of a card and thereafter convert signals from the sensed data into vector sets. The vector sets are then compared to known vector sets of a verified deck of cards.

Upon completion of the shuffling and verification processes, the card shuffler may send a signal to a local printer which subsequently, upon receipt of the signal, prints a label indicating the appropriate verification information. The label may then be affixed to the shuffled cards and the cards may then be stored in a secured vault until casino personnel subsequently deliver the cards from the vault to the appropriate game table. A dealer may then access the cards and load the shuffled decks into a shoe for immediate use in a casino game.

In addition, conventional card shufflers are capable of performing a self-diagnosis and accordingly, displaying diagnostic results on an associated display device. Diagnostic results may include errors or alerts for events such as card jams, missing cards, extra cards and a host of other abnormal events.

As described above, conventional card handling devices require some level of human control and direction during operation. Currently, casino personnel must stand next to the card handling device as it performs the shuffling and card verification tasks and then monitor the results displayed on a display device located on the card shuffler. Traditionally, casinos and casino personnel are very busy; therefore, it is essential that card handling devices work efficiently. It is equally important that the amount of human hours spent monitoring these devices be as limited as possible in order to allow the casino personnel to attend to other issues elsewhere in the casino.

There is a need for methods and apparatuses to provide increased system efficiency and reliability of a card handling device. Specifically, there is a need for a card handling device that can access a network and communicate with a device user regarding various information including, by way of example only, current or past operation of the device, maintenance or repair of the device, current or past performance of the device, and the location of the device. Such a card handling device would desirably decrease the time and effort involved in the monitoring process, and, therefore, increase the efficiency of the card handling device.

BRIEF SUMMARY OF THE INVENTION

An embodiment of the present invention includes an automatic card handling device comprising a shuffling apparatus that is configured for shuffling an input set of cards and delivering an output set of cards resulting from the shuffling. The automatic card handling device further comprises a detection module configured for recognizing a rank and sit of each card of the output set of cards. The detection module recognizes the rank and suit prior to removal of the output set of cards from the shuffling apparatus. Further included in the automatic card handling device is a communication module operably coupled to the detection module. The communication module is configured for sending and receiving information related to operation of the automatic card handling device across a communication port that is configured for operable coupling to a communication network.

Another embodiment of the present invention includes a network of card handling devices comprising a plurality of automatic card handling devices according to an embodiment of the invention. The network of card handling devices further comprises a communication network operably coupled to the communication port of each automatic card handling device of the plurality.

Another embodiment of the present invention includes a network of card handling devices comprising at least one local communication network. The at least one local communication network comprises at least one automatic card handling device according to an embodiment of the invention. The network of card handling devices her includes at least one local server, wherein each of the at least one local server is operably coupled to one of the at least one local communication network and wherein the at least one local server is configured to send and receive information over the at least one local communication network to which it is coupled.

Another embodiment of the present invention includes a method of operating a network of automatic card handling devices comprising establishing a communication link across a communication network between at least one automatic card handling device and at least one server. The method further includes transmitting information from the at least one automatic card handling device to the at least one server across the communication network, wherein the information is related to the operation of the at least one automatic card handling device.

Yet another embodiment of the present invention includes a computer-readable media storage medium storing instructions that when executed by a processor cause the processor to perform instructions for operating a network of automatic card handling devices according to an embodiment of the invention.

BRIEF DESCRIPTION OF THE DRAWINGS

In the drawings:

FIGS. 3(a), 3(b) and 3(c) are block diagrams of an automatic card handling device according to embodiments of the invention;

DETAILED DESCRIPTION OF THE INVENTION

The present invention, in various embodiments, comprises apparatuses and methods of operation for an automatic card handling device used within a network of card handling devices to address the efficiency concerns associated with conventional card handling devices.

In the following description, circuits and functions may be shown in block diagram form in order not to obscure the present invention in unnecessary detail. Conversely, specific circuit implementations shown and described are examples only and should not be construed as the only way to implement the present invention unless specified otherwise herein. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

Further, the term "module" is used herein in a non-limiting sense and solely to indicate functionality of particular circuits and assemblies included within embodiments of the invention, and may not be construed as requiring a particular physical structure, or particular partitioning between elements of the invention performing indicated functions.

In his description, some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

When executed as firmware or software, the instructions for performing the methods and processes described herein may be stored on a computer readable medium. A computer readable medium includes, but is not limited to, magnetic and optical storage devices such as disk drives, magnetic tape, CDs (compact discs), DVDs (digital versatile discs or digital video discs), and semiconductor devices such as RAM, DRAM, ROM, EPROM, and Flash memory.

In describing embodiments of the present invention, the systems and elements surrounding the invention are first described to better understand the function of embodiments of the invention as it may be implemented within these systems and elements.

Figure 1:
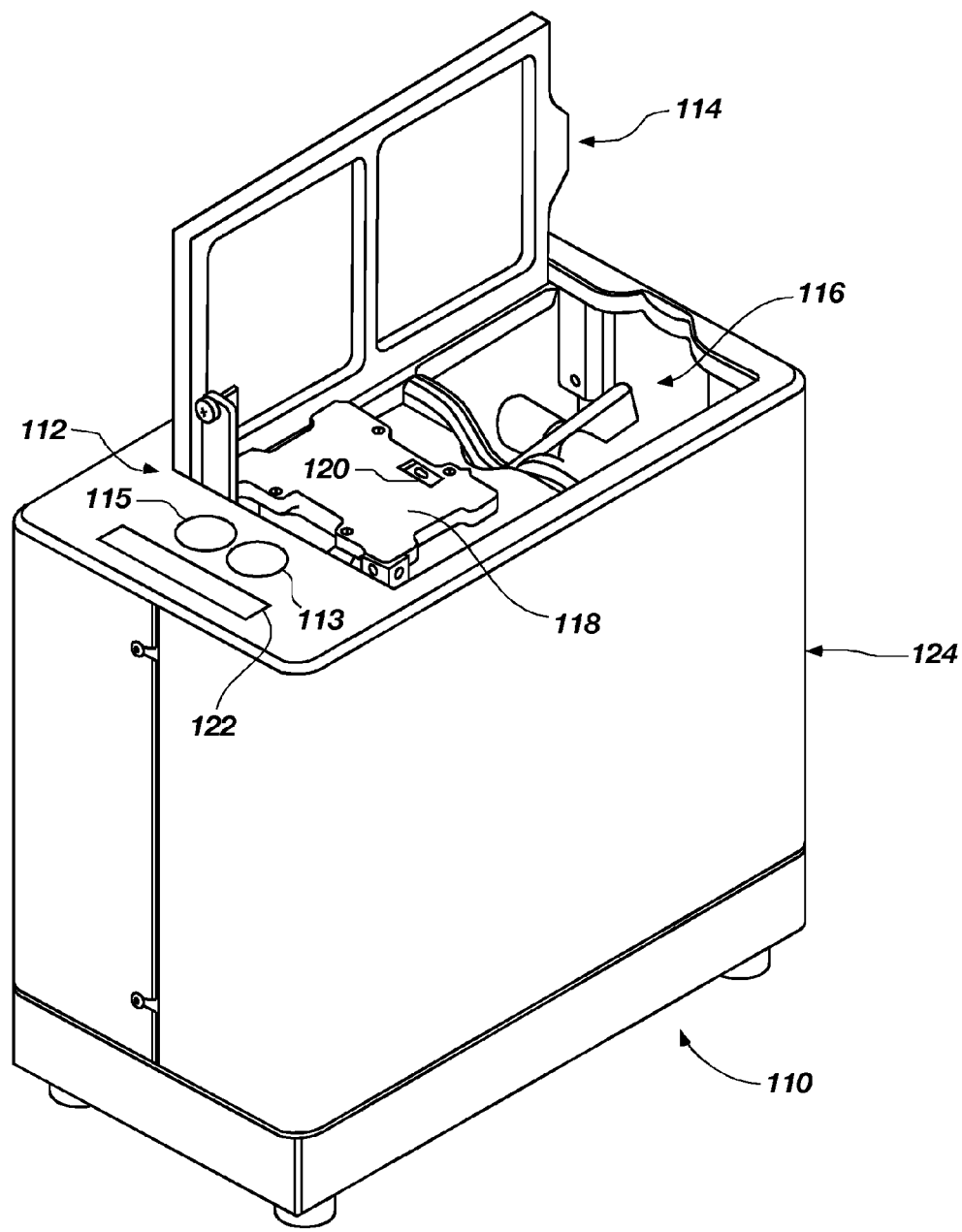
FIG. 1 is an illustration of a card handling device according to an embodiment of the invention.

FIG. 1 illustrates a card handling device 110. A top surface 112 of card handling device 110 may comprise a flip-up cover 114 which, when opened, exposes a card insertion area 116 and an elevator platform 118. Card insertion area 116 may be configured to receive an input set of cards to be shuffled, counted, and/or sorted. By way of example only, card handling device 110 may be configured to receive, read rank and suit, sort, and shuffle up to eight decks of cards at any one time. Elevator platform 118 may be configured to raise a set of shuffled cards to a level where they can be removed by a device user after the shuffling, reading, and/or sorting processes are completed. Elevator platform 118 may include a sensor 120 which detects the presence of cards or other objects located on elevator platform 118. A camera 142 or a card recognition module 154 (see FIGS. 2 and 3) may also be included within the body 124 of card handling device 110. Card handling device 110 may be located adjacent to or flush mounted into a gaming table in a casino where a live card game is taking place, or may be located in a remote location off the casino floor, which is inaccessible to the public.

Card handling device 110 may also be configured to display operational data relating to the device to a display panel 122 located on top surface 112. A casino employee using the card handling device 110 may monitor display panel 122 and view the displayed information in order to know the status of operation of the card handling device 110. Such information displayed on display panel 122 may include the number of cards present in the card handling device 110, the status of any shuffling, reading, or sorting operations, security information relating to the card handling device 110, status relating to a card verification process, or any other information about errors, or the operation of card handling device 110 that would be useful to a user. Buttons 113, 115, located adjacent display panel 122 may be on-off buttons, special function buttons (e.g., raise elevator to the card delivery position, reshuffle demand, security check, card count demand, etc.), and the like.

Figure 2:
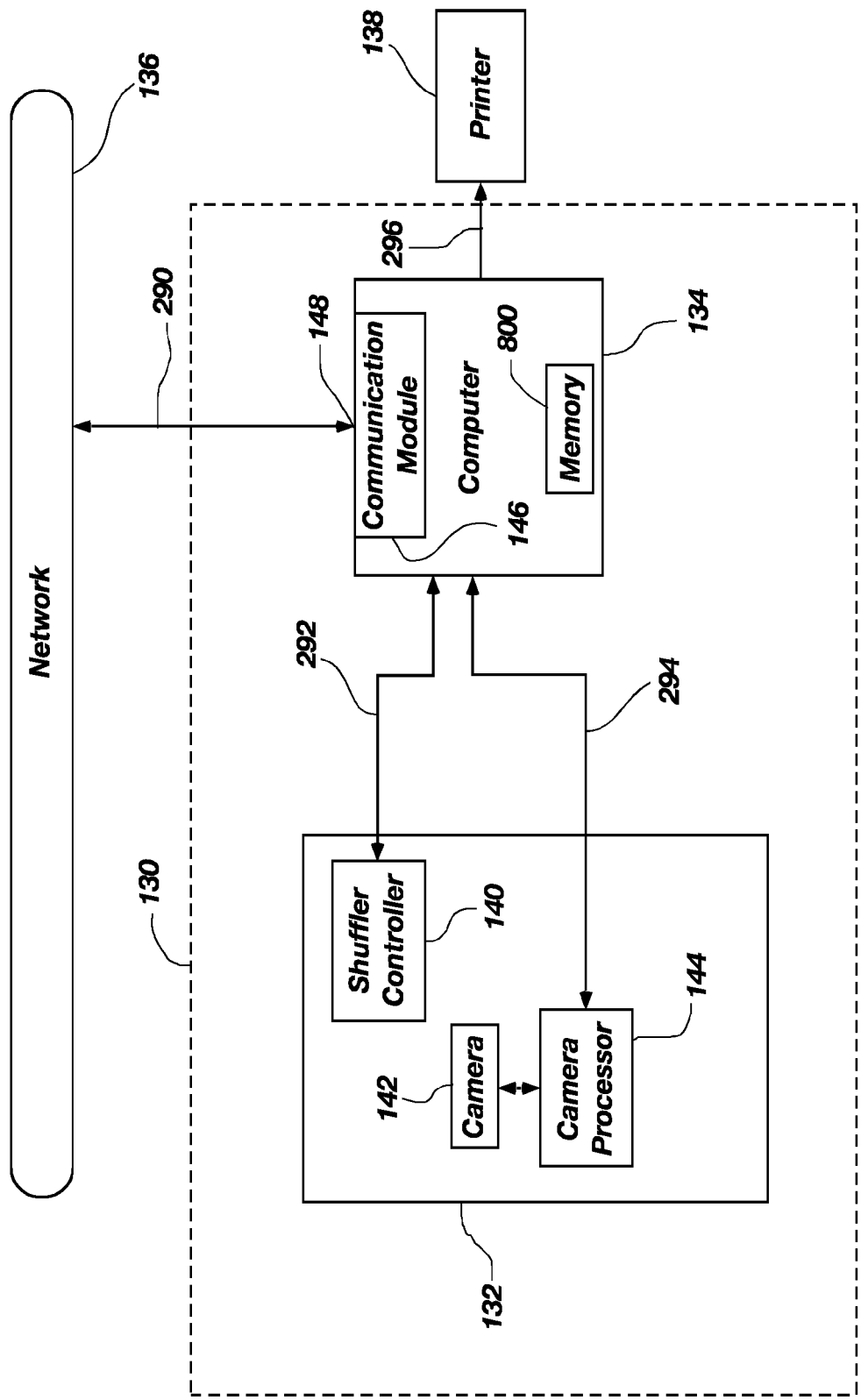
FIG. 2 is a block diagram of an automatic card handling device operably coupled to a local network according to an embodiment of the invention.

FIG. 2 illustrates an embodiment of a card handling device 130 comprising a shuffler 132 operably connected to a computer 134. Shuffler 132 may include a shuffler controller 140, and a camera processor 144 operably coupled to camera 142. Shuffler controller 140 and camera processor 144 are both operably coupled to computer 134 by connections 292 and 294, respectively. Computer 134 may comprise a communication module 146 and a communication port 148 configured for operable coupling to network 136 via communication link 290. Computer 134 may also be operably coupled to printer 138 via communication link 296. Network 136 may comprise a local network or a publicly accessible network, such as the Internet. Communication links 290 and 296 may comprise any form of wireless or wired connections or any combination thereof. By way of example, and not limitation, communication links 290 and 296 may include serial data links, parallel data links, Ethernet, a Wide Area Network (WAN), a Local Area Network (LAN), 802.11a/b/g, Wi-Fi, and other suitable communications links. As described in more detail below, communication module 146 may be configured to establish an electronic communication with network 136 and thereafter send and receive information to and from network 136 across communication port 148. In another example of the invention, the communication module 146 and memory 800 reside within the shuffler 132 and communicate with the shuffler controller 140.

Upon shuffler 132 receiving an input set of cards, shuffler controller 140 is configured to count the cards and, as the cards are being counted, camera 142 is configured to take a picture of at least a portion of each counted card. Thereafter, data representing pictures and a card count are sent to computer 134 which iterates through the pictures and extracts the card value from the picture of each card. Computer 134 then generates information relating to the input set of cards by associating the value of each individual card with its counted position in the deck. The card information is then used by the computer 134 to verify the contents of the deck by comparing the information relating to the input set of cards to information relating to a standard deck of cards stored in the memory 800 of computer 134. Computer 134 may be configured to operate in multiple modes and may be capable of automatically switching between multiple modes without powering off or rebooting. By way of example, computer 134 may be configured to operate in a set-up mode, ran mode, or a service mode, as are explained more fully below.

As described above, card handling device 130 is configured to display, on display panel 122 (see FIG. 1), any data pertaining to the operation of card handling device 130. Card handling device 130 may be further configured to convert the aforementioned operational data into electronic data signals comprising information such as, repair-related data, data related to current or past operation, the serial number of the card handling device 130, the serial numbers of device parts, physical location of card handling device 130, performance, usage, or any other data related to card handling device 130. At any time after an electronic communication has been established by computer 134, communication module 146 may transmit the information through communication port 148 and across network 136 via communication link 290. As described in greater detail below, the information may then be transmitted to a server 162 where the data can be viewed by a device operator, stored, mined, or forwarded to casino personnel or a service center 168 (see FIGS. 5 and 6). Additionally, computer 134 may be configured to send information comprising the shuffling and card verification results to a printer 138 via communication link 296. Printer 138 may be configured to, upon receipt of the information, print a label with the verification results that may then be affixed to the output set of cards, for example. The printer 138 could also print a wide variety of messages, such as service requests, hours of operation, number of batches of cards shuffled, particular cards missing, and the like.

FIGS. 3(*a*) through 3(*c*) illustrate various embodiments of card handling device 150. FIG. 3(*a*) illustrates a logical partitioning of functions within the card recognition module 154, whereas FIGS. 3(*b*) and 3(*c*) illustrate different embodiments of physical partitioning of the card recognition module 154. Of course, these partitioning solutions, both logical and physical, are example solutions, other embodiments with different partitioning solutions are contemplated within the scope of the invention.

As illustrated in the logical partitioning of FIG. 3(*a*), card handling device 150 includes a shuffler 156 and a card recognition module 154. Shuffler 156 includes a sensor module 214 that is operably coupled to card recognition module 154 via connection 380 and is configured for sensing image information about each card included in an input set of cards. The sensor module 214 may include, for example, a two-dimensional CMOS image sensor, a two-dimensional charge coupled device (CCD) image sensor, or a one-dimensional line sensor, as are known by those in the art. Card recognition module 154 comprises a communication module 146 configured for establishing an electronic communication with a local network or a world-wide network. Communication module 146 may be further configured to transmit and receive information over the network. Further included in the card recognition module 154 is a detection module 219 configured for verifying the contents of an input set of cards, and a diagnosis module 212 configured for performing a self-diagnosis on the operation of card handling device 150, as are explained more fully below.

FIG. 3(*b*) illustrates a physical partitioning embodiment of card handling device 150' wherein the card recognition module 154' comprises a custom module 228 including custom logic configured to establish an electronic communication with a network and thereafter transmit and receive information over the network. The custom module 228 may include logic configured for performing the functions of the communication module 146, the detection module 219, and the diagnosis module 212. By way of example, and not limitation, the custom module 228 may be implemented as a custom application specific integrated circuit (ASIC), a field programmable gate array (FPGA), one or more programmable logic devices (PLDs) and similar devices for implementing custom logic as are known to those of ordinary skill in the art.

In another embodiment of card handling device 150", card recognition module 154" may comprise, as illustrated in FIG. 3(*c*), a microcontroller 222 operably coupled to a memory module 224. Microcontroller 222 may be configured to perform the functions of the communication module 146, the detection module 219, and the diagnosis module 212. As such, microcontroller 222 may be configured to establish an electronic communication with a network and transmit and receive information over the network by employing software or firmware stored on memory module 224. Of course, many microcontrollers suitable for the card recognition module 154", may include memory as part of the microcontroller 222. Therefore, a memory module 224 external to the microcontroller 222 may not be necessary.

In another embodiment, card recognition module 154" may include a hardware communication module 226. In this configuration, the communication function may be implemented completely in hardware, or may be a combination of hardware and software functions configured to establish an electronic communication with a network and thereafter transmit and receive information over the network.

Although the card recognition module 154 in the figures is shown as part of the shuffler 156, in other embodiments, the card recognition module 154 may be located in an external computer that communicates with the shuffler.

Figure 4:
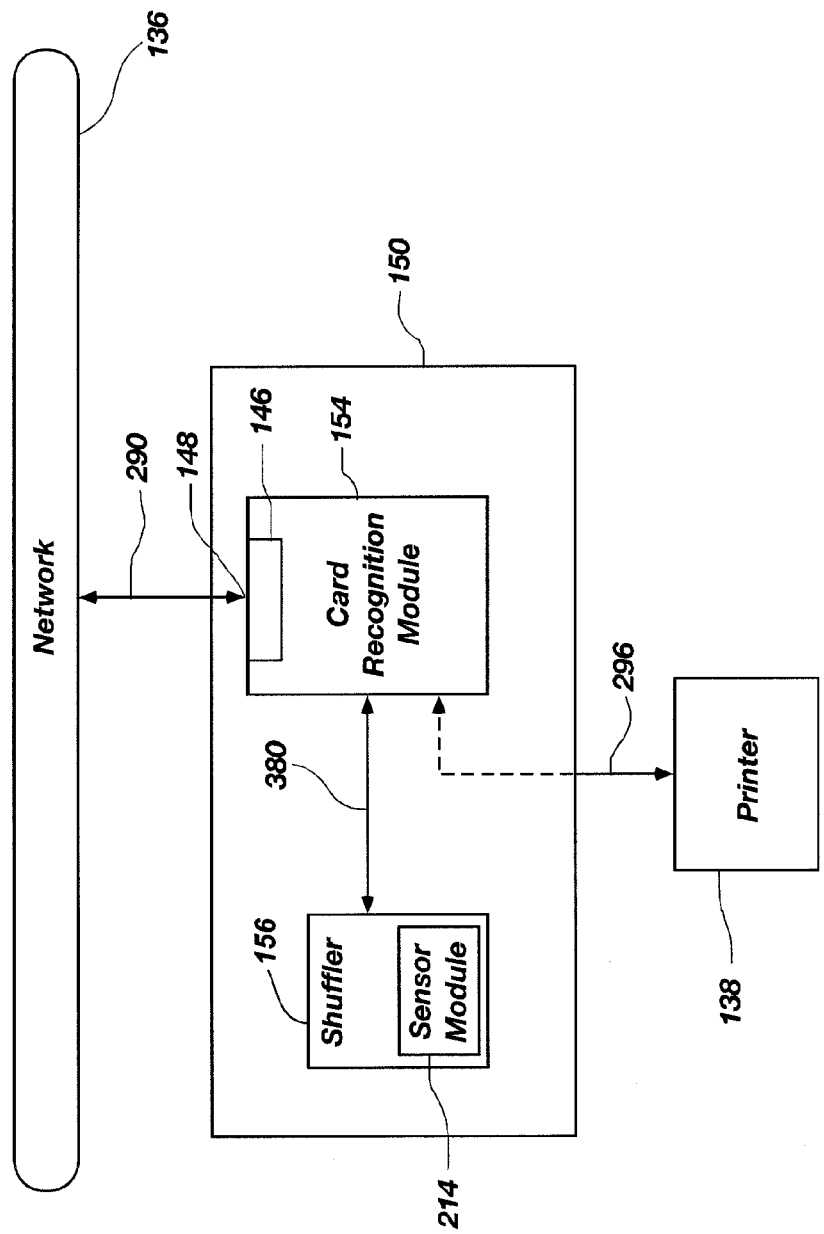
FIG. 4 is a block diagram of an automatic card handing device operably coupled to a local network according to an embodiment of the invention.

FIG. 4 illustrates another embodiment of the invention wherein card handling device 150 is coupled to network 136. Card handling device 150 may comprise a shuffler 156 and a card recognition module 154 operably coupled together by way of connection 380. Additionally, card recognition module 154 may comprise a communication module 146 and a communication port 148 directly coupled to network 136 via communication link 290. Card recognition module 154 may also be operably coupled to printer 138 via communication link 296. As described above, communication module 146 may be configured to establish an electronic communication with network 136 and thereafter send and receive information over network 136, which may comprise a local network or a world-wide network. Communication links 290 and 296 may comprise any form of wireless or wired connections or any combination thereof.

The operation of card handling device 150 depicted in FIG. 4 will now be described. As a set of input cards is placed into card handling device 150, shuffler controller 156 is configured to shuffle the input set of cards, and sensor module 214 captures image information about each card either before, during or after the shuffling process. The image information is sent to the card recognition module 154 where the detection module 219 (see FIG. 3($a$)) processes the image information for each card to determine the rank and suit of each card. The image information may be transformed into a rank and suit by an image recognition process of the rank and suit designations on each card. As explained earlier, the image recognition process may be performed as software/firmware operating on the microcontroller 222 or may be performed by custom logic within the custom module 228 (see FIGS. 3($a$)-3($c$)). Card recognition module 154 may be configured to operate in multiple modes and may be capable of automatically switching between multiple modes without powering off or rebooting. By way of example, card recognition module 154 may be configured to operate in a set-up mode, run mode, or a service mode, as are explained more fully below.

In addition to shuffling and verifying the contents of an input set of cards, card handling device 150 may, at any time while powered on, establish an electronic communication with network 136. Thereafter, card handling device 150 may transmit the results of the shuffling and verification processes or any other data relating to the card handling device 150, such as, diagnostic messages, identity messages, and location messages over network 136 to server 162 (see FIGS. 5 and 6). Furthermore, card recognition module 154 may be configured to send information comprising the shuffling, maintenance information, power, operational information, and card verification results to a printer 138 by way of communication link 296. Printer 138 may be configured to, upon receipt of the information, print a label or other report with information such as verification results that can then be affixed to the output set of cards.

Figure 5:
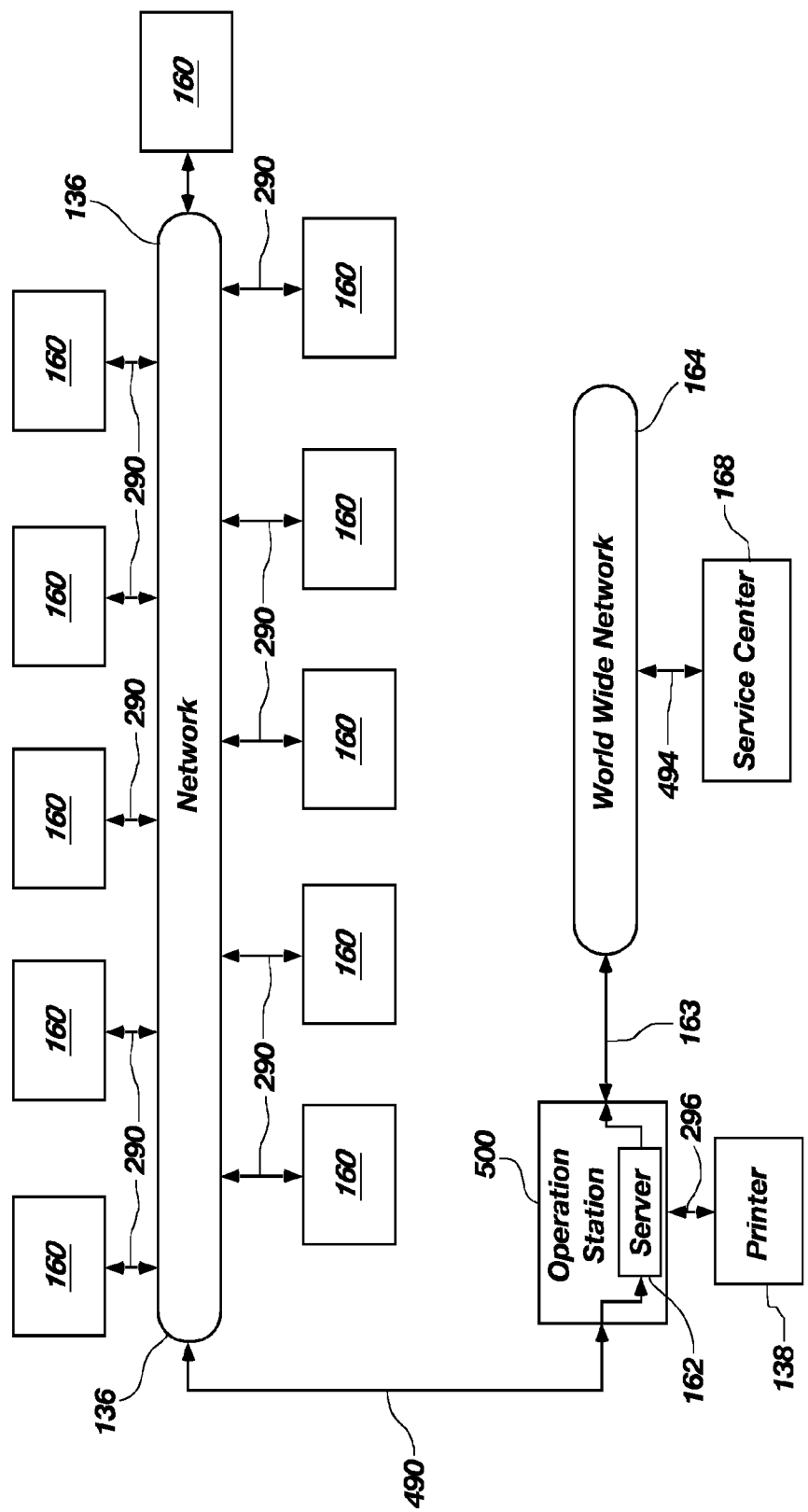
FIG. 5 is a block diagram of a network of automatic card handling devices in accordance with an embodiment of the invention.

FIG. 5 illustrates an embodiment of the invention comprising a network of card handling devices 160. Card handling devices 160 may be located on a casino floor adjacent a playing table or in a back-room location off the casino floor and may be comprised of either card handling device 130 described in FIG. 2, or card handling device 150 described in FIGS. 3 and 4. Each card handling device 160 is operably coupled to a network 136 over corresponding communication links 290. Network 136 may be operably coupled via communication link 490 to a server 162 located within operator station 500 which is a computerized machine control system. Operator station 500 and server 162 may be located within the casino property and may be operably coupled to printer 138 and a world-wide network 164 by communication links 296 and 163, respectively. Server 162 may be located within operator station 500, as shown in FIG. 5, or may be located separate from, and operably coupled to, operator station 500. A service center 168, which may be located either on the casino property or at a remote location, may be operably coupled to server 162 across world-wide network 164 via communication links 494 and 163. Communication links 163, 290, 296, 490, and 494 may comprise any form of wireless or wired connections, or any combination thereof.

Figure 6:
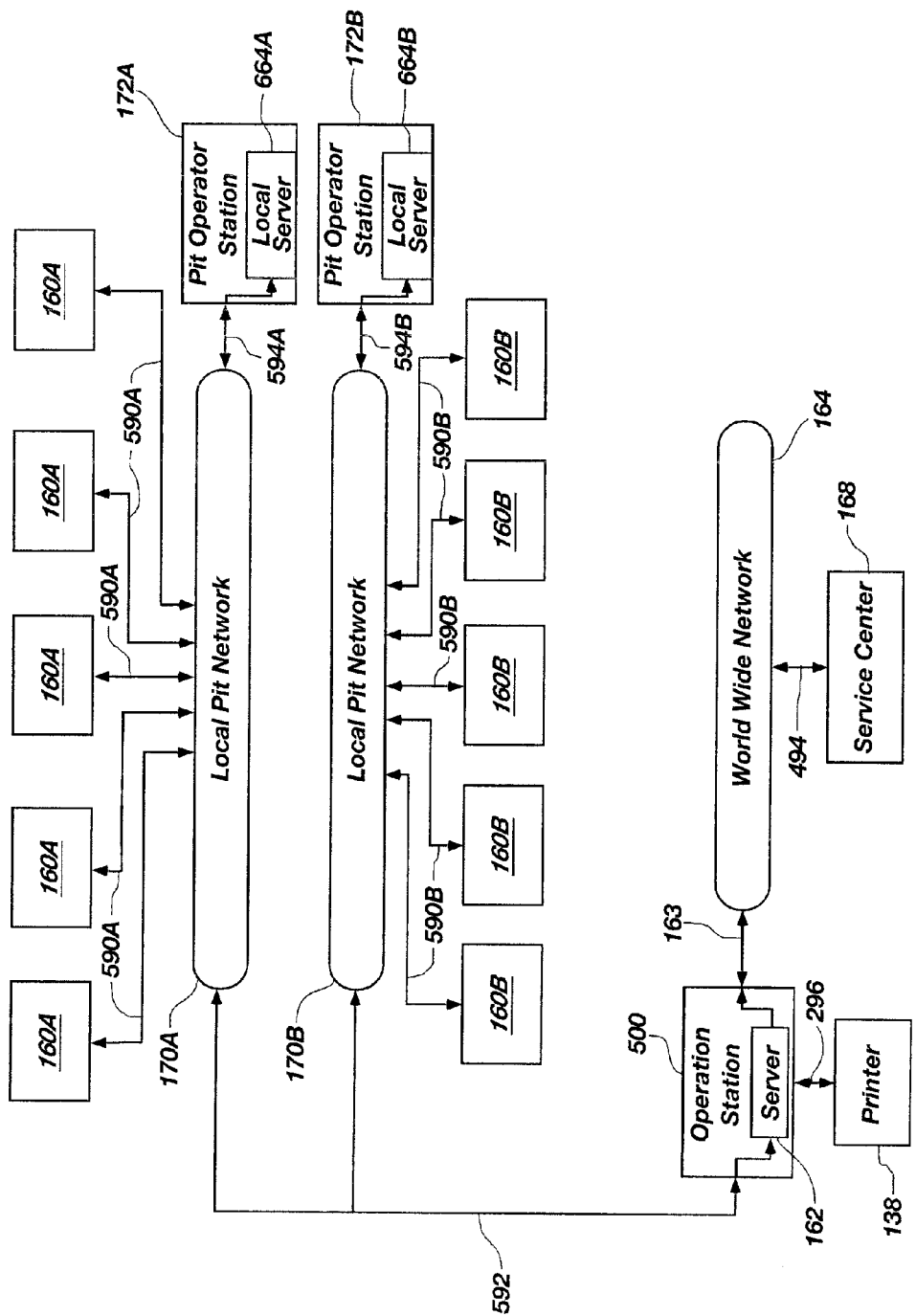
FIG. 6 is a block diagram of another network of automatic card handling devices according to an embodiment of the invention.

The operation of the network of card handling devices depicted in FIG. 5 will now be described. At any time while a card handling device 160 is powered on, the card handling device 160 may establish an electronic communication with network 136 and thereafter transmit any information pertaining to the card handling device 160 across network 136 to server 162. As illustrated in FIGS. 5 and 6, server 162 is located within operator station 500. Therefore, any data received by server 162 may be accessed by a device operator within operator station 500. Conversely, if server 162 is located outside of operator station 500, any data received at server 162 may be forwarded to operator station 500. As such, a device operator accessing operator station 500 may receive the information and monitor the status of each card handling device 160. Upon receipt of any information, server 162 may be configured to store, mine, assemble, or forward the information to casino personnel or to a device technician located within service center 168. For example only, casino personnel or a device technician may receive the transmitted information by way of a graphical user interface (GUI) comprising a visual or audio alerting system on a computer, cell phone, or other like data receiving device.

By way of example only, card handling device 160 may be configured to transmit an email or a text message, containing the operational status of one or more card handling devices 160, to server 162, which may then transmit the email or text message to service center 168 or any data receiving device belonging to casino personnel. A transmitted email or text message may comprise, for example, information detailing whether the input set of cards has successfully passed the shuffling and verification processes. If the input set of cards has failed the verification process, a transmitted email or text message may contain the reasons for failure, and may list the missing card or cards should the card handling device 160 detect a missing card or cards. Other data contained in an email, text message or the like may comprise information identifying the location of the card handling device 160, the name and location of the casino, and directions to the casino as well as the casino pit where the card handling device 160 resides. Card handling device 160 may also be configured, upon diagnosing a problem, to transmit an alert or a request across network 136 to server 162. Thereafter, server 162 may forward the alert or request to operator station 500, casino personnel, or to service center 168.

Card handling device 160 may also be configured to generate a report comprising a description of the location and relative performance of all the operational elements of card handling device 160. The generated report may then be transmitted electronically over network 136 to server 162. Server 162 may then forward the report to service center 168, or to a computer, cell phone or any other data receiving device belonging to a device technician or casino personnel. Upon receipt of a generated report, casino personnel or a device technician can quickly locate the corresponding card handling device 160 and, thereafter, may address current problems or future problems that may eventually exist in the corresponding card handling device 160. The report could generate a repair request, a preventative maintenance request, could or could identify the device as requiring a software upgrade, etc.

Additionally, the card handling device 160 may be configured to receive information comprising messages and instructions such as, work commands or a self-diagnosis request from a device operator located within operator station 500. As such, in addition to monitoring multiple card handling devices 160, a device operator located within operator station 500 may control multiple card handling devices 160 at any given time. Additionally, a technician, located at a remote location such as service center 168, may perform troubleshooting routines or install software or firmware upgrades and patches on card handling device 160 by using an electronic communication link between the card handling device 160 and a computer (not shown) located within service center 168.

As described above, card handling device 160 may be configured to operate in multiple modes and may be capable of automatically switching between modes without powering off or rebooting. As such, a device operator may simultaneously control multiple card handling devices 160 by changing the operation mode of a card handling device 160 and thereafter running programs on, sending data requests, or sending work commands to the card handling device 160. By way of example, and not limitation, a device operator located within an operator station 500 may switch a card handling device 160 to a service mode and request a self-diagnosis, conduct troubleshooting routines, or install software updates and patches. Additionally, card handling device 160 may, upon receiving an input set of cards, automatically switch to a set-up mode and activate a calibration check in order to verify proper calibration before switching to a run mode to thereafter shuffle and/or verify the input set of cards.

FIG. 6 illustrates another embodiment of the invention comprising a network of card handling devices 160A networked together according to a common trait, such as physical location and/or game type. The following description, although in reference to card handling devices 160A, local pit network 170A and pit operator station 172B, also applies to card handling devices 160B, local pit network 170B and pit operator station 172B, as well as communication links 590B and 594B. For example only, a network of card handling devices 160A located on a single casino floor or within a limited area of a single casino floor may be networked together. Likewise, for example, a network of card handling devices 160A pertaining to a specific game type, such as blackjack, may be networked together. Each card handling device 160A in a similar network is operably coupled by communication link 590A to a local pit network 170A which may correspond to, as described above, the location or the game type of the card handling device 160A. Each local pit network 170A is, in turn, operably connected by communication link 594A to a local pit operator station 172A. As illustrated in FIG. 6, pit server 664A is located within pit operator station 172A. Therefore, any data received by pit server 664A may be accessed by a device operator within pit operator station 172A. Conversely, pit server 664A may be located outside of pit operator station 172A and any data received at pit server 664A may be forwarded to pit operator station 172A.

As described above, at any time while powered on, each card handling device 160A located within a local pit network 170A may be configured to establish an electronic communication with local pit network 170A, and transmit information relating to its operation to pit server 664A. Also, each card handling device 160A may be configured to receive messages or instructions from pit server 664A. As such, a pit operator, located within pit operator station 172A, may simultaneously monitor and control each card handling devices device 160A located in the corresponding local pit network 170A. Each card handling device 160B is networked together and directly coupled to a local pit network 170B in a similar fashion as described above in reference to each card handling device 160A. Therefore, each card handling device 160B may transmit and receive messages to and from pit server 664B over local pit network 170B.

In addition, local pit networks 170A/170B may be operably coupled to server 162, via communication link 592. Server 162 may be operably connected to a printer 138 via communication link 296. Service center 168 may be operably coupled to server 162 across a world-wide network 164 via communication links 494 and 163. In addition to transmitting and receiving information to and from the pit server 664A/664B, each card handling device 160A/160B may, as described above, transmit and receive information to and from server 162 across local pit networks 170A/170B. As such, a device operator located within operator station 500 may simultaneously monitor and control each card handling device 160A/160B of each local pit network 170A/170B. The operational data transmitted from card handling device 160A/160B and received at server 162 may be viewed by a device operator, stored, mined, assembled, or forwarded on to service center 168 over world-wide network 164. Additionally, the operational data may be transmitted to a computer, cell phone, or like data receiving device belonging to casino personnel. Communication links 296, 494, 590A, 590B, 592, and 594A, 594B may comprise any form of wireless or wired connections or any combination thereof.

Additionally the card handling device 160A/160B may be configured to receive information comprising messages and instructions such as, work commands or a self-diagnosis request from a device operator located within operator station 500. As such, in addition to monitoring multiple card handling devices 160A/160B, a device operator located within operator station 500 may control multiple card handling devices 160A/160B at any given time. Additionally, a technician, located at a remote location such as service center 168, may perform troubleshooting routines or install software upgrades and patches on card handling device 160A/160B by using an electronic communication link between the card handling device 160A/160B and a computer (not shown) located within service center 168.

Specific embodiments have been shown by way of example in the drawings and have been described in detail herein; however the invention may be susceptible to various modifications and alternative forms. It should be understood that the invention is not intended to be limited to the particular forms disclosed. Rather, the invention includes all modifications, equivalents, and alternatives falling within the spirit and scope of the invention as defined by the following appended claims.

What is claimed is:

1. An automatic card handling device, comprising:
 a shuffling apparatus with a controller, the shuffling apparatus configured for shuffling an input set of cards and delivering randomly ordered cards resulting from the shuffling and the controller configured for determining shuffler operational data indicating functionality parameters of the shuffling apparatus and shuffler usage data indicating usage parameters of the shuffling apparatus; and a communication module operably coupled to the controller and configured for sending information related to an operation performed by the automatic card handling device, the information including at least one of the shuffler operational data and the shuffler usage data;

wherein the automatic card handling device is configured to at least transmit the information to a server over a communication network operably coupled to the automatic card handling device, the server, and at least one other automatic card handling device.

2. The card handling device of claim 1, further comprising a detection module configured for recognizing a rank and suit of each card of the delivered cards prior to removal of the cards from the shuffling apparatus.

3. The card handling device of claim 2, further comprising a microcontroller configured for performing the functions of the detection module and the communication module.

4. The card handling device of claim 3, wherein the microcontroller is further configured with a diagnosis module configured for performing a self-diagnosis on the card handling device.

5. The card handling device of claim 3, wherein the microcontroller is further configured to selectively operate in one of a set-up, run, and service mode.

6. The card handling device of claim 2, further comprising a custom hardware module configured for performing the functions of the detection module and the communication module.

7. The card handling device of claim 6, wherein the custom hardware module is further configured to selectively operate in one of set-up, run, and service mode.

8. The card handling device of claim 6, wherein the custom hardware module is further configured with a diagnosis module configured for performing a self-diagnosis on the card handling device.

9. The card handling device of claim 1, wherein the communication module is further configured for sending unsolicited data related to at least one of the shuffler operational data and shuffler usage data.

10. A network of card handling devices, comprising:
a plurality of automatic card handling devices, each card handling device of the plurality comprising:
a shuffling apparatus with a controller, the shuffling apparatus configured for shuffling an input set of cards and delivering randomly ordered cards resulting from the shuffling and the controller configured for determining shuffler operational data indicating functionality parameters of the shuffling apparatus and shuffler usage data indicating usage parameters of the shuffling apparatus; and
a communication module operably coupled to the controller and configured for sending at least one of the shuffler operational data and the shuffler usage data across a communication port to a server; and
a communication network operably coupled to the communication port of each card handling device of the plurality and the server.

11. The network of card handling devices of claim 10, wherein each card handling device of the plurality of automatic card handling devices further comprises a detection module configured for recognizing a rank and suit of each card of the delivered cards prior to removal of the cards from the shuffling apparatus.

12. The network of card handling devices of claim 10, further comprising a server operably coupled to the communication network and configured to send and receive information from the plurality of card handling devices over the communication network and a world-wide network.

13. The network of card handling devices of claim 12, wherein the server is located within an operator station.

14. The network of card handling devices of claim 12, further comprising a service center operably coupled to the server over the world-wide network.

15. The network of card handling devices of claim 14, wherein the communication network comprises one of a local network and the world-wide network.

16. The network of card handling devices of claim 10, wherein the communication network comprises one of a wireless communication network and a wired communication network or a combination thereof.

17. The network of card handling devices of claim 10, wherein the communication module is further configured for sending unsolicited data related to at least one of the shuffler operational data and shuffler usage data.

18. A network of card handling devices comprising:
a local communication network, comprising:
a plurality of automatic card handling devices, each automatic card handling device of the plurality comprising:
a shuffling apparatus configured for shuffling an input set of cards and delivering randomly ordered cards resulting from the shuffling and configured for determining shuffler operational data indicating functionality parameters of the shuffling apparatus and shuffler usage data indicating usage parameters of the shuffling apparatus;
a detection module configured for recognizing a rank and suit of each card of the delivered cards prior to removal of the cards from the shuffling apparatus; and
a communication module operably coupled to the detection module and configured for sending information related to respective of maintenance of the at least one automatic card handling device, repair of the respective automatic card handling device, the shuffler operational data, and the shuffler usage data to one or more local communication networks of the at least one local communication network; and
at least one local server operably coupled to local communication network and wherein the at least one local server is configured to send and receive information over the local communication network.

19. The network of card handling devices of claim 18, wherein each of the at least one local server is located within a pit operator station.

20. The network of card handling devices of claim 18, further comprising an external server operably coupled to each of the local communication networks.

21. The network of card handling devices of claim 20, wherein the external server is configured to send and receive information across the local communication network and a world-wide network.

22. The network of card handling devices of claim 20, wherein the external server is located within an operator station.

23. The network of card handling devices of claim 22, further comprising a service center operably coupled to the external server over a world-wide network.

24. A method of operating a network of automatic card handling devices, comprising:
- establishing a communication link across a communication network between a plurality of automatic card handling devices and at least one server;
- transmitting a service request from at least one automatic card handling device of the plurality of automatic card handling devices to the at least one server across the communication network; and
- transmitting at least one of shuffler operational data and shuffler usage data from the at least one automatic card handling device of the plurality across the communication network, wherein the shuffler operational data includes functionality parameters of the at least one automatic card handling device and the shuffler usage data includes usage parameters of the at least one automatic card handling device.

25. The method of claim 24, further comprising receiving control information at the at least one automatic card handling device from the at least one server.

26. The method of claim 25, wherein the control information received comprises one of a work command, a software or firmware upgrade, and a self-diagnosis request.

27. The method of claim 24, further comprising transmitting at least one message from the at least one server to a service center across a world-wide network.

28. The method of claim 27, wherein the at least one message comprises one of an alert and a request.

29. The method of claim 27, further comprising performing troubleshooting routines on the at least one automatic card handling device from the service center across the world-wide network and the communication network.

30. The method of claim 27, further comprising installing software updates or patches on the at least one automatic card handling device from the service center across the world-wide network and the communication network.

31. A non-transitory computer-readable media storage medium storing instructions that when executed by a processor cause the processor to perform instructions for participating in a network of automatic card handling devices, the instructions comprising:
- establishing a communication link across a communication network between a plurality of automatic card handling devices and at least one server; and
- transmitting information related to an identity and a location stored within of at least one automatic card handling device of the plurality from the least one automatic card handling device to the at least one server across the communication network.

32. The non-transitory computer-readable media storage medium of claim 31, wherein the instructions further comprise receiving control information at the at least one automatic card handling device from the at least one server.

33. The non-transitory computer-readable media storage medium of claim 32, wherein the control information received comprises one of a work command, a software or firmware upgrade, and a self-diagnosis request.

34. The non-transitory computer-readable media storage medium of claim 31, wherein the instructions further comprise transmitting at least one message from the at least one server to a service center across a world-wide network.

35. The non-transitory computer-readable media storage medium of claim 34, wherein the at least one message comprises one of an alert and a request.

36. The non-transitory computer-readable media storage medium of claim 34, wherein the instructions further comprise performing troubleshooting routines on the at least one automatic card handling device from the service center across the world-wide network and the communication network.

37. The non-transitory computer-readable media storage medium of claim 34, wherein the instructions further comprise installing software updates or patches on the at least one automatic card handling device from the service center across the world-wide network and the communication network.

* * * * *